Oct. 19, 1948. D. E. RENSHAW 2,451,977
CONTROL SYSTEM
Filed April 3, 1945
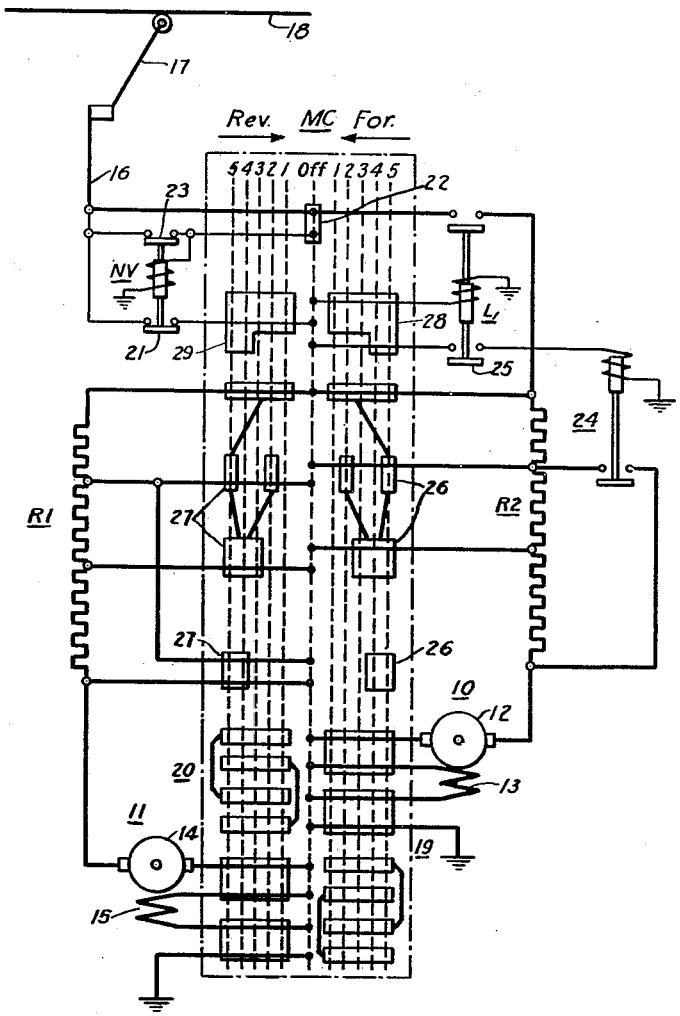
WITNESSES:
INVENTOR
David E. Renshaw
BY
ATTORNEY Patented Oct. 19, 1948

2,451,977

UNITED STATES PATENT OFFICE 2,451,977

CONTROL SYSTEM

David E. Renshaw, Wilkinsburg, Pa., assignor to Westinghouse Electric Corporation, East Pittsburgh, Pa., a corporation of Pennsylvania Application April 3, 1945, Serial No. 586,383

5 Claims. (Cl. 318—274)

My invention relates, generally, to control systems and more particularly, to systems for controlling the operation of the propelling motors of electric vehicles, such as mining locomotives and the like.

It is desirable that electric braking means be provided for vehicles of certain types, particularly mining locomotives, because power failures frequently occur in mines, the current collector frequently leaves the trolley wire, the mechanical brakes on mining locomotives are frequently defective and there are no brakes on the trailing cars which can be applied in case of an emergency.

When a locomotive is equipped with parallel-connected motors, dynamic braking can be established in case of power failure or in case the collector leaves the trolley wire, by reversing the connections of the motor field windings with respect to the armature windings. The dynamic braking effect will be directly proportional to the locomotive speed and inversely proportional to the ohmic value of that portion of the accelerating resistor which is in the motor circuit when dynamic braking is established.

If the controller is provided with manually operable contact members for shunting the accelerating resistor, and its handle is in the full speed running position, all of the accelerating resistors will be short circuited, and the braking current will be excessive except at a very low locomotive speed. An excessive current may result in flashing of a motor commutator.

If the locomotive is equipped with an electrically controlled line switch or magnetic contactor, it is easy for the operator to simulate the condition of power failure or collector off the trolley wire merely by opening a control switch which disconnects the control power from the line contactor.

An object of my invention, generally stated, is to provide a dynamic braking system which shall be simple and efficient in operation and which may be economically manufactured and installed.

A more specific object of my invention is to provide for limiting the current produced during dynamic braking of electric motors.

Other objects of my invention will be explained fully hereinafter or will be apparent to those skilled in the art.

In accordance with one embodiment of my invention, the current generated during dynamic braking is limited to an amount which is not harmful to the motors of a vehicle by utilizing an electrically controlled switch for shunting a portion of the accelerating and braking resistor and so connecting the control circuit for this switch that the switch will not be closed during dynamic braking. In this manner sufficient resistance is always in the motor circuit to limit the braking current to a safe value.

For a fuller understanding of the nature and objects of my invention, reference may be had to the following detailed description, taken in conjunction with the accompanying drawing, in which the single figure is a diagrammatic view of a control system embodying the invention.

Referring to the drawing, the system shown therein comprises a pair of motors 10 and 11, which may be of a type suitable for propelling an electric vehicle, such as a mining locomotive (not shown). The motor 10 is provided with an armature winding 12 and a series field winding 13. The motor 11 is provided with an armature winding 14 and a series field winding 15. The power for operating the motors 10 and 11 may be supplied through a power conductor 16 which is connected through a current collector 17 to a trolley conductor 18. The trolley conductor 18 may be energized from any suitable source of power, such as a power generating station (not shown).

In accordance with the usual practice, the motors 10 and 11 may be connected to the power conductor 16 in parallel-circuit relation by means of an electrically controlled switch L1, the operation of which is controlled by a controller MC. The controller MC may be of the drum type having a plurality of contact fingers which engage segments on the controller drum, as shown, or it may be of the cam type in which the contact members are closed by cams actuated by the controller shaft.

The controller MC is provided with contact members 19 and 20 for controlling the direction of operation of the vehicle by reversing the connections of the field windings with respect to the armature windings of the motors 10 and 11. The controller is also provided with a plurality of contact members for shunting resistors R1 and R2 from the motor circuits in order to control the motor current during acceleration of the motors in a manner which will be described more fully hereinafter.

In accordance with the usual practice, a no voltage relay NV is provided for preventing the application of full voltage to the motors after a failure of the line voltage. As shown, contact members 21 of the relay NV are connected in the energizing circuit for the actuating coil of the line switch L1. The actuating coil of the relay NV is energized through a contact segment 22 which is closed normally when the master controller MC is in the "off" position. The relay NV is provided with holding contact members 23 for maintaining the actuating coil energized so long as the power conductor 16 is energized. Thus, if the power conductor 16 becomes deenergized after the controller MC has been actuated to one of the operating positions, the contact members 21 of the relay NV are opened to deenergize the actuating coil of the switch L1, and it is necessary to return the controller MC to the "off" position in order to reclose the contact members 21 of the relay NV after line voltage is restored. In this manner the switch L1 cannot be reclosed to apply power to the motors without the resistors R1 and R2 being connected in the motor circuit.

As explained hereinbefore, it is desirable to provide for establishing a dynamic braking circuit for the motors 10 and 11 in the event the power conductor 16 becomes deenergized as a result of a failure of the power source or in case the current collector 17 becomes disengaged from the trolley conductor 18. As is well known in the art, a dynamic braking circuit for the motors 10 and 11 may be established by actuating the controller MC to the reverse position, thereby causing the motors to function as generators to produce a dynamic braking current which circulates through the motors. However, it is essential that at least a portion of one of the resistors R1 or R2 be connected in the dynamic braking circuit in order to prevent an excessive amount of current from flowing.

In order to insure that all of the resistors R1 and R2 cannot be shunted from the motor circuit during dynamic braking even though the controller MC is actuated to the full running position, an electrically controlled switch 24 is provided for shunting a portion of the resistor R1 from the motor circuit. As shown, the energizing circuit for the actuating coil of the switch 24 is established through an interlock 25 on the line switch L1. Thus, the switch 24 can be closed only when the switch L1 is closed to connect the motors 10 and 11 to the power conductor 16. Since dynamic braking of the motors 10 and 11 can be obtained only when the switch L1 is open to disconnect the motors from the power source, dynamic braking can be obtained only when the switch 24 is open, thereby insuring that a portion of the resistor R1 is connected in the motor circuit at all times during dynamic braking regardless of the position of the master controller MC.

As explained hereinbefore, the switch L1 cannot be reclosed upon the restoration of voltage to the power conductor 16 without the controller being returned to the "off" position to permit the reclosing of the relay NV and the switch L1. In this manner power may be reapplied to the motors by operating the controller MC through the accelerating positions in the usual manner.

The switch 24 may be a magnetic contactor or an electro-pneumatic contactor of a type well known in the art in which the operation of the switch is controlled by an electrically operated magnet valve. It will be understood that additional switches similar to the switch 24 may be utilized, if desired, thereby providing for the insertion of additional amounts of resistance in the motor circuit during dynamic braking.

The present system provides for all normal functions, such as acceleration, speed regulation and directional control of the motors 10 and 11 by operating the controller MC in the usual manner. Thus, during normal operation, the controller may be actuated to cause its contact segments 26 and 27 to shunt the resistors R1 and R2 from the motor circuits step-by-step. The switch 24 is energized through either contact segment 28 or 29 at the proper time during the accelerating cycle to shunt a portion of the resistor R1 from the motor circuit.

In case it is desired to establish dynamic braking as the result of the deenergization of the power conductor 16 which, as explained hereinbefore, causes the opening of the switch L1, the controller MC is actuated to the reverse position. Since the switch 24 cannot be closed while the conductor 16 is deenergized and the switch L1 is open, sufficient resistance remains connected in the motor circuit to limit the dynamic braking current to a safe value irrespective of the position to which the controller may be actuated.

From the foregoing description, it is apparent that I have provided a system which permits normal operation of an electric vehicle or other electrically propelled machine and which provides for dynamic braking of the propelling motor or motors when disconnected from the power source. The dynamic braking effect can be controlled in the usual manner by operating the controller to control the amount of the resistance in the dynamic braking circuit. However, all of the resistance cannot be shunted from the circuit irrespective of the position to which the controller might be actuated under emergency conditions. Thus, an excessive amount of current is prevented from being produced during dynamic braking, and flashing of the motors is prevented at normal operating speeds. In this manner a vehicle, such as a mining locomotive, may be operated more safely.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a motor control system, in combination, a motor, a power conductor, switching means for connecting the motor to the power conductor, a resistor for controlling the motor current, means for shunting the resistor step-by-step, control means for establishing dynamic braking connections for the motor when the power conductor is deenergized, and means controlled by said switching means and responsive to the deenergization of said power conductor for preventing the shunting of all of said resistor during dynamic braking.

2. In a motor control system, in combination, a motor, a power conductor, switching means for connecting the motor to the power conductor, a resistor for controlling the motor current, means for shunting the resistor step-by-step, control means for establishing dynamic braking connections for the motor when the power conductor is deenergized, and means electrically controlled through said switching means for preventing the shunting of all of said resistor during dynamic braking.

3. In a motor control system, in combination, a motor, a power conductor, switching means for connecting the motor to the power conductor, a resistor for controlling the motor current, means for shunting the resistor step-by-step, control means for establishing dynamic braking connections for the motor when the power conductor is deenergized, and means electrically controlled through said switching means and operable upon the deenergization of said power conductor to prevent the shunting of all of said resistor during dynamic braking.

4. In a motor control system, in combination, a motor, a power conductor, switching means for connecting the motor to the power conductor, a resistor for controlling the motor current, a manually operable controller for controlling the shunting of said resistor, said controller being operable to establish dynamic braking connections for the motor when the power conductor is deenergized, and means electrically controlled through said switching means for preventing the shunting of all of said resistor during dynamic braking.

5. In a motor control system, in combination, a motor, a power conductor, switching means for connecting the motor to the power conductor, a resistor for controlling the motor current, a manually operable controller for controlling the shunting of said resistor, said controller being operable to establish dynamic braking connections for the motor when the power conductor is deenergized, and means electrically controlled through said switching means and responsive to the deenergization of said power conductor for preventing the shunting of all of said resistor during dynamic braking.

DAVID E. RENSHAW.

REFERENCES CITED

The following references are of record in the file of this patent:

UNITED STATES PATENTS

| Number | Name | Date |
|---|---|---|
| 1,155,484 | Hall | Oct. 5, 1915 |
| 1,371,603 | Clarke | Mar. 15, 1921 |
| 1,390,526 | Gazda | Sept. 13, 1921 |
| 1,492,138 | Meyer | Apr. 29, 1924 |
| 1,891,226 | Fox | Dec. 20, 1932 |